United States Patent
Lee et al.

(10) Patent No.: US 11,780,297 B2
(45) Date of Patent: Oct. 10, 2023

(54) HEAT MANAGEMENT SYSTEM

(71) Applicant: Hanon Systems, Daejeon (KR)

(72) Inventors: Hae-Jun Lee, Daejeon (KR); In-Guk Hwang, Daejeon (KR)

(73) Assignee: Hanon Systems, Daejeon (KR)

( * ) Notice: Subject to any disclaimer, the term of this patent is extended or adjusted under 35 U.S.C. 154(b) by 206 days.

(21) Appl. No.: 17/415,296

(22) PCT Filed: Dec. 16, 2019

(86) PCT No.: PCT/KR2019/017759
§ 371 (c)(1),
(2) Date: Jun. 17, 2021

(87) PCT Pub. No.: WO2020/130518
PCT Pub. Date: Jun. 25, 2020

(65) Prior Publication Data
US 2022/0055454 A1    Feb. 24, 2022

(30) Foreign Application Priority Data

Dec. 21, 2018    (KR) .................. 10-2018-0167483

(51) Int. Cl.
*F25B 13/00* (2006.01)
*B60H 1/32* (2006.01)
(Continued)

(52) U.S. Cl.
CPC ....... *B60H 1/3213* (2013.01); *B60H 1/00278* (2013.01); *B60H 1/3227* (2013.01);
(Continued)

(58) Field of Classification Search
CPC .............. B60H 1/3213; B60H 1/32284; B60H 1/00278; B60H 1/3227; B60L 58/27; B60L 58/26
(Continued)

(56) References Cited

U.S. PATENT DOCUMENTS

2016/0107508 A1    4/2016 Johnston

FOREIGN PATENT DOCUMENTS

DE    102009060860 A1    7/2011
DE    112014006161 T5    10/2016
(Continued)

OTHER PUBLICATIONS

International Search Report issued in PCT/KR2019/017759 dated Mar. 23, 2020.
(Continued)

*Primary Examiner* — Davis D Hwu
(74) *Attorney, Agent, or Firm* — Norton Rose Fulbright US LLP; James R. Crawford

(57) ABSTRACT

Heat management system includes a refrigerant circulation line including a compressor for compressing and discharging a refrigerant, a water cooling-type condenser for condensing the compressed refrigerant using cooling water, a first expansion valve for expanding the condensed refrigerant, and a water cooling-type evaporator for evaporating the expanded refrigerant using cooling water; a heating line including a heater core which circulates the cooling water that has exchanged heat in the water cooling-type condenser, and thereby generates conditioned air for heating; a cooling line including a cabin cooler which circulates the cooling water that has exchanged heat in the water cooling-type evaporator, and thereby generates conditioned air for cooling; and a cooling line which is connected to or disconnected from the heating line according to the cooling/heating mode, and cools a battery and an electrical component.

25 Claims, 12 Drawing Sheets

(51) Int. Cl.
  *B60L 58/27* (2019.01)
  *B60L 58/26* (2019.01)
  *B60H 1/00* (2006.01)
(52) U.S. Cl.
  CPC .......... *B60H 1/32284* (2019.05); *B60L 58/26* (2019.02); *B60L 58/27* (2019.02)
(58) Field of Classification Search
  USPC .............................................. 61/160; 62/160
  See application file for complete search history.

(56) References Cited

FOREIGN PATENT DOCUMENTS

| | | | |
|---|---|---|---|
| DE | 102017206327 A1 | 10/2018 | |
| DE | 102018112968 A1 | 6/2019 | |
| FR | 3025297 A | * 3/2016 | |
| JP | 2010012949 | * | 1/2010 |
| JP | 2010012949 A | * | 1/2010 |
| JP | 2016068790 A | | 5/2016 |
| KR | 20110134213 A | | 12/2011 |
| KR | 20120014622 A | | 2/2012 |
| KR | 20120065027 A | | 6/2012 |
| KR | 20140147365 A | | 12/2014 |
| KR | 20150041739 A | | 4/2015 |
| KR | 20170108447 A | | 9/2017 |
| KR | 20180065332 A | | 6/2018 |
| WO | 2015141210 A1 | | 9/2015 |

OTHER PUBLICATIONS

Office Action dated Aug. 4, 2022 by the German PTO in the corresponding Patent Application No. 11 2019 006 348.0, with English translation.

* cited by examiner

HEAT MANAGEMENT SYSTEM

CROSS REFERENCE TO RELATED APPLICATIONS

This application is a national phase under 35 U.S.C. § 371 of International Application No. PCT/KR2019/017759 filed on Dec. 16, 2019, which claims the benefit of priority from Korean Patent Application No. 10-2018-0167483 filed on Dec. 21, 2018. The entire contents of these applications are incorporated herein by reference in their entirety.

TECHNICAL FIELD

The present invention relates to a heat management system, and more particularly, to a system not only managing cooling and heating of a vehicle but also managing the heat of an electric component and a battery in the vehicle.

BACKGROUND ART

In an automotive field, an electric vehicle is spotlighted as an implementation of eco-friendly technology and a solution for energy depletion.

The electric vehicle may run using a motor driven by receiving electric power from a battery or a fuel cell, and thus emit less carbon and produce less noise. In addition, the electric vehicle may be eco-friendly because the vehicle uses the motor more energy efficient than a conventional engine.

However, the electric vehicle may generate a lot of heat when operating its battery and drive motor, and heat management of the vehicle is thus important. In addition, it takes long time to recharge its battery, and it may thus be important to efficiently manage battery usage time. In particular, a refrigerant compressor of the electric vehicle, which is driven for conditioning interior air, is also powered by electricity. Therefore, it may be more important to efficiently manage the battery usage time. In addition, the drive motor and an inverter may generate more heat than another electric component such as the battery or a charger. It is thus necessary to cool the drive motor to an appropriate temperature. For this purpose, a heat exchanger cooling the drive motor is required to have a higher cooling performance.

In addition, when a heat management system is in a heat pump mode, a refrigerant flowing into the compressor may have a lower pressure due to a refrigerant heat exchanger, and accordingly, a heat pump may not function as the heat pump or may have deteriorated performance and efficiency.

RELATED ART DOCUMENT

Patent Document

KR 2014-0147365 A (Dec. 30, 2014)

DISCLOSURE

Technical Problem

An object of the present invention is to provide a heat management system capable of not only managing cooling and heating of a vehicle but also efficiently managing the heat of an electric component and a battery in the vehicle, and improving its heat pump performance and system efficiency.

Technical Solution

In one general aspect, a heat management system includes: a refrigerant circulation line 200 including a compressor 210 compressing and discharging a refrigerant, a water-cooled type condenser 220 condensing the compressed refrigerant using cooling water, a first expansion valve 240 expanding the condensed refrigerant, and a water-cooled type evaporator 242 evaporating the expanded refrigerant using the cooling water; a heating line 301 including a heater core 440 generating conditioned air for heating by circulating the cooling water heat-exchanged through the water-cooled type condenser 220; an air conditioning line 305 including a cabin cooler 520 generating conditioned air for cooling by circulating the cooling water heat-exchanged through the water-cooled type evaporator 242; and a cooling line 302 connected to or disconnected from the heating line 301 to cool a battery 350 and an electric component 460 based on a cooling/heating mode.

In addition, the air conditioning line 305 may include the cabin cooler 520 cooling an interior by using air cooled by allowing the cooling water heat-exchanged with the refrigerant through the water-cooled evaporator 242 and air flowing into the interior to be heat-exchanged with each other, and a fourth cooling water pump 510 connected between the water-cooled type evaporator 242 and the cabin cooler 520, and the cooling water line on which the water-cooled type evaporator 242, the fourth cooling water pump 510, and the cabin cooler 520 are connected to one another may form a closed loop.

In addition, the heat management system may further include an air conditioner 150 including a blower 152 blowing air into the interior, wherein the water-cooled type evaporator 242 and the fourth cooling water pump 510 may be disposed outside the air conditioner 150, and the cabin cooler 520 is disposed inside the air conditioner 150.

In addition, the air conditioning line 305 may further include a reservoir tank 530 connected between the fourth cooling water pump 510 and the cabin cooler 520.

In addition, a refrigerant heat exchanger 233 may allow the refrigerant flowing into the first expansion valve 240 and the refrigerant discharged from the water-cooled type evaporator 242 to be heat-exchanged with each other in the cooling mode, and may not allow the refrigerant flowing into the first expansion valve 240 and the refrigerant discharged from the water-cooled evaporator 242 to be heat-exchanged with each other in the heating mode.

In addition, the cooling line 302 may include a first connection line 302-1 branched from one side of the cooling line 302 and connected to the heating line 301, and a second connection line 302-2 branched from the other side of the cooling line 302 and connected to the heating line 301.

In addition, the first connection line 302-1, the second connection line 302-2, and the heating line 301 may be connected to a first direction switching valve 410, and the cooling line 302 and the heating line 301 may be connected to or disconnected from each other by the first direction switching valve 410.

In addition, the electric component 460 may be disposed on the second connection line 302-2.

In addition, the cooling line 302 may further include a fourth connection line 302-4 connecting the first connection line 302-1 and the second connection line 302-2 with each other, and a shut-off valve 360 installed on the fourth connection line 302-4 and disposed in parallel with the first direction switching valve 410.

In addition, the cooling line 302 may further include a cooling water temperature sensor 461 installed in front of the electric component 460 in a direction in which the cooling water flows.

In addition, the refrigerant circulation line 200 may further include a second expansion valve 251 distributing the refrigerant branched behind the water-cooled type condenser 220 in a direction in which the refrigerant flows, a chiller 252, and a refrigerant heat exchanger 233 allowing the refrigerant flowing into the first expansion valve 240 and the refrigerant discharged from the water-cooled type evaporator 242 to be heat-exchanged with each other, the refrigerant heat exchanger 233 being connected in parallel with the chiller 252.

In addition, the refrigerant heat exchanger 233 may be connected in series with the water-cooled type evaporator 242.

In addition, the cooling line 302 may include a third connection line 302-3 connected in parallel with the battery 350 and passing through the chiller 252, the third connection line 302-3 being connected to the cooling line 302 by a third direction switching valve 330, and the cooling water flowing into or being blocked from flowing into the third connection line 302-3 by the third direction switching valve 330.

In addition, the refrigerant circulation line 200 may further include an accumulator 260 disposed between the water-cooled type evaporator 242 and the compressor 210 and connected therebetween.

In addition, the cooling line 302 may include an electric radiator 310 cooling the cooling water using air.

In addition, the heating line 301 may include a heater core 440 heating the interior using air heated by allowing the cooling water heat-exchanged with the refrigerant through the water-cooled type condenser 220 and air flowing into the interior to be heat-exchanged with each other, and a cooling water heater 430 disposed in front of the heater core 440 in a direction in which the cooling water flows and heating the cooling water.

In addition, the heating line 301 may include a heater core 440 heating the interior using air heated by allowing the cooling water heat-exchanged with the refrigerant through the water-cooled type condenser 220 and air flowing into the interior to be heat-exchanged with each other, and may further include an air-heated type heater 470 formed separately from the heating line 301 and heating the interior by directly heating air flowing into the interior.

In addition, in a mild cooling mode, the second expansion valve 251 may be blocked not to allow the refrigerant to pass through the chiller 252.

In addition, in a battery heating mode, the refrigerant may not be circulated through the refrigerant circulation line 200, and the cooling water may not be circulated through the air conditioning line 305.

In addition, in a mild heating mode, the refrigerant may not be circulated through the refrigerant circulation line 200, and the cooling water may not be circulated through the air conditioning line 305.

Advantageous Effects

As set forth above, the present invention may provide the heat management system not only managing the cooling and heating of a vehicle but also efficiently managing the heat of an electric component and a battery in the vehicle.

In addition, the cooling line using the cooling water may be applied for cooling the vehicle interior, and the refrigerant circulation line in which the refrigerant is circulated may thus be disposed in a vehicle exterior rather than in the vehicle interior. Accordingly, the refrigerant pipe may have a shorter length and thus reduce a filling amount of the refrigerant, and the components of the refrigerant circulation line may be modularized.

In addition, a highly-efficient natural refrigerant may be used as the refrigerant used in the refrigerant circulation line, thereby improving the efficiency of the heat management system.

BEST MODE

Hereinafter, a heat management system of the present invention having the above-described configuration is described in detail with reference to the accompanying drawings.

Figure 1:
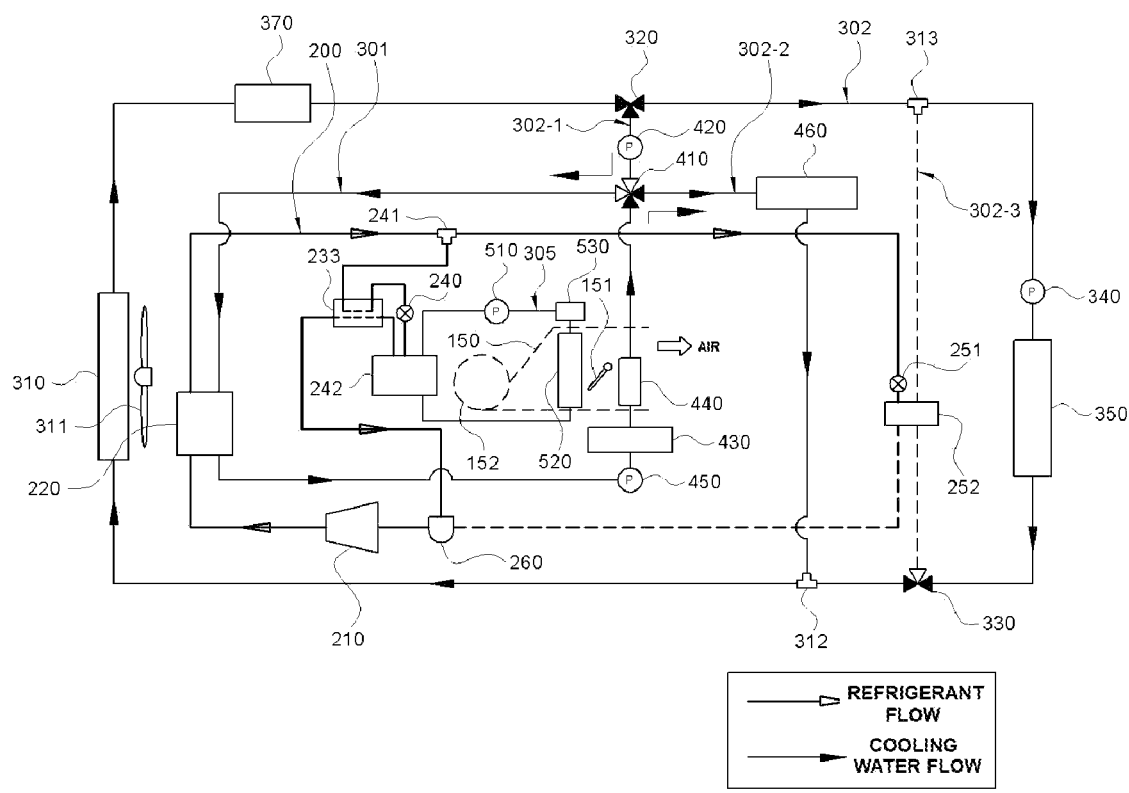
FIG. 1 is a block diagram showing a heat management system according to an exemplary embodiment of the present invention.

FIG. 1 is a block diagram showing a heat management system according to an exemplary embodiment of the present invention.

Referring to FIG. 1, the heat management system of the present invention may roughly include a refrigerant circulation line 200, an air conditioning line 305 cooling a vehicle interior using cooling water heat-exchanged with a refrigerant on the refrigerant circulation line 200, and a cooling water circulation line 300 heating the interior and cooling components by having the cooling water circulated therethrough. In addition, the cooling water circulation line 300 may include a heating line 301 for heating the interior, and a cooling line 302 for cooling an electric component 460 and a battery 350.

The refrigerant circulation line 200 may include a compressor 210, a water-cooled type condenser 220, a refrigerant branch 241, a first expansion valve 240, a water-cooled type evaporator 242, a refrigerant heat exchanger 233, an accumulator 260, a second expansion valve 251 and a chiller 252.

The compressor 210 may be an electric compressor driven by receiving electric power, may draw in and compress the refrigerant, and may then discharge the refrigerant toward the water-cooled type condenser 220.

The water-cooled type condenser 220 may allow the refrigerant discharged from the compressor 210 to be heat-exchanged with the cooling water, condense the refrigerant to be a liquid refrigerant, and send the liquid refrigerant toward the water-cooled type evaporator 242 or the chiller 252.

The refrigerant branch 241 may be formed behind the water-cooled type condenser 220 in a direction in which the refrigerant flows, and two lines may be branched from the refrigerant branch 241, in which one line may be connected to the water-cooled type evaporator 242 and the other line may be connected to the chiller 252.

The first expansion valve 240 and the second expansion valve 251 may serve to throttle the refrigerant, or allow or block a flow of the refrigerant. In addition, the first expansion valve 240 and the second expansion valve 251 may be disposed in parallel with each other. That is, the two refrigerant lines may be branched from the refrigerant branch 241, in which the first expansion valve 240 may be disposed on one of the two branched refrigerant lines and the second expansion valve 251 may be disposed on the other refrigerant line. Here, the first expansion valve 240 may be disposed in front of the water-cooled type evaporator 242, and the second expansion valve 251 may be disposed in front of the chiller 252.

The water-cooled type evaporator 242 may be disposed behind the first expansion valve 240 in the direction in which the refrigerant flows, and may be heat-exchanged with the cooling water as the refrigerant passes therethrough. In addition, the water-cooled type evaporator 242 may be disposed outside an air conditioner 150 of a vehicle.

The refrigerant heat exchanger 233 may serve to improve a cooling performance by allowing the refrigerant flowing into the first expansion valve 240 and the refrigerant discharged from the water-cooled type evaporator 242 to be heat-exchanged with each other. Here, a refrigerant inlet line, by which the refrigerant branch 241 and the first expansion valve 240 are connected to each other and through which the refrigerant flows into the water-cooled type evaporator 242, may pass through the refrigerant heat exchanger 233, a refrigerant outlet line, by which the water-cooled type evaporator 242 and the accumulator 260 are connected to each other and through which the refrigerant is discharged from the water-cooled type evaporator 242, may pass through the refrigerant heat exchanger 233, and the refrigerant passing through the refrigerant inlet line and the refrigerant passing through the refrigerant outlet line may be heat-exchanged with each other. Therefore, the refrigerant may be cooled further before flowing into the first expansion valve 240 by the refrigerant heat exchanger 233. It is thus possible to improve the cooling performance and simultaneously improve efficiency of a cooling system, by the water-cooled type evaporator 242. In particular, the refrigerant heat exchanger 233 may be connected in parallel with the chiller 252. That is, the refrigerant heat exchanger 233 may be disposed adjacent to the water-cooled type evaporator 242 rather than be disposed on the refrigerant line in series between the water-cooled type condenser 220 and the chiller 252. The refrigerant heat exchanger 233 and the water-cooled type evaporator 242 may thus be disposed in series and connected to each other. If the refrigerant heat exchanger 233 is disposed in series between the water-cooled type condenser 220 and the chiller 252, this disposition may allow a pressure drop on a portion of a low pressure and lower a heating performance in a heating mode. On the contrary, if the refrigerant heat exchanger 233 is connected in parallel therewith, the heating performance as well as the cooling performance may be increased. The reason is that there is no refrigerant heat exchanger 233 between the water-cooled type condenser 220 and the chiller 252 in a refrigerant flow in the heating mode.

The chiller 252 may be disposed behind the second expansion valve 251 in the direction in which the refrigerant flows, and heat-exchanged with the cooling water to cool the cooling water. Therefore, the first expansion valve 240 and the water-cooled type evaporator 242 may form a pair, and the second expansion valve 251 and the chiller 252 may form another pair. These two pairs may be disposed in parallel with each other on the refrigerant line. In addition, the refrigerant lines respectively behind the water-cooled type evaporator 242 and the chiller 252, in the direction in which the refrigerant flows, may merge into a single refrigerant line.

In addition, the accumulator 260 may disconnect the liquid refrigerant and a gas refrigerant from each other among the refrigerant and may supply only the gas refrigerant to the compressor 210. Here, the accumulator 260 may be disposed at a point where the respective refrigerant lines behind the water-cooled type evaporator 242 and the chiller 252 merge together and connected therebetween. The accumulator 260 may be disposed in front of the compressor 210 in the direction in which the refrigerant flows.

The air conditioning line 305 may include the water-cooled type evaporator 242, a cabin cooler 520, a reservoir tank 530, and a fourth cooling water pump 510. Here, the cooling water line on which the water-cooled type evaporator 242, the cabin cooler 520, the reservoir tank 530, and the fourth cooling water pump 510 are connected to one another may form a closed loop.

At the water-cooled type evaporator 242, the refrigerant and the cooling water may be heat-exchanged with each other while passing therethrough as described above.

The cabin cooler 520 may function as an air-cooled evaporator, and the cooling water, which is cooled by being heat-exchanged with the refrigerant passing through the water-cooled type evaporator 242, may pass through the cabin cooler 520. In addition, the cabin cooler 520 may be disposed inside the air conditioner 150, and air flowing by the blower 152 of the air conditioner may be cooled while passing through the cabin cooler 520, conditioned air for cooling may be supplied to the vehicle interior to be used for cooling the vehicle interior.

The reservoir tank 530 may store the cooling water and replenish insufficient cooling water on the cooling water line.

The fourth cooling water pump 510 may serve to pump the cooling water so that the cooling water is circulated through the air conditioning line 305. In addition, the fourth cooling water pump 510 may be installed on the cooling water line between the water-cooled type evaporator 242 and the reservoir tank 530, and may circulate the cooling water by operating the fourth cooling water pump 510.

Here, the reservoir tank 530 and the fourth cooling water pump 510 may be disposed outside the air conditioner 150.

Therefore, in the heat management system of the present invention, the cooling line using the cooling water may be applied for cooling the vehicle interior, and the refrigerant circulation line through which the refrigerant is circulated may thus be disposed in a vehicle exterior rather than in the vehicle interior. Accordingly, a refrigerant pipe may have a shorter length and thus reduce a filling amount of the refrigerant, and the components of the refrigerant circulation line may be modularized. In addition, a highly-efficient natural refrigerant may be used as the refrigerant used in the refrigerant circulation line, thereby improving the efficiency of the heat management system.

The heating line 301 may include the water-cooled type condenser 220, a first cooling water pump 450, a cooling water heater 430, a heater core 440, and a first direction switching valve 410.

At the water-cooled type evaporator 220, the refrigerant and the cooling water may be heat-exchanged with each other while passing therethrough as described above.

The first cooling water pump 450 may be a means of pumping the cooling water so that the cooling water is circulated through the heating line 301, and the first cooling water pump 450 may be disposed behind the water-cooled type condenser 220 in the direction in which the cooling water flows and installed on the cooling water line.

The cooling water heater 430 may be a device that heats the cooling water, and may be disposed behind the first cooling water pump 450 and in front of the heater core 440 in the direction in which the cooling water flows, and connected therebetween. In addition, the cooling water heater 430 may be operated when a temperature of the cooling water is below a predetermined temperature, and may be implemented in various forms such as an induction heater, a seeds heater, a positive temperature coefficient (PTC) heater, a film heater, and the like which may generate heat using the electric power.

The heater core 440 may be disposed within the air conditioner 150 of the vehicle, and air blown by the blower 152 may be heated while passing through the heater core 440, and conditioned air for heating may be supplied to the vehicle interior to be used to heat the vehicle interior. In addition, the heater core 440 may be disposed behind the cooling water heater 430 in the direction in which the cooling water flows, and connected thereto.

The first direction switching valve 410 may be installed between the heater core 440 and the water-cooled type condenser 220, and may be configured to be selectively connected to or disconnected from the heating line 301 and the cooling line 302, which is described below. In more detail, the first direction switching valve 410 may be installed on the heating line 301, and two cooling water line pipes may be connected to the first direction switching valve 410, one line, i.e. first connection line 302-1, branched from one side of the cooling line 302 may be connected to the first direction switching valve 410, and the other line, i.e. second connection line 302-2, branched from the other side of the cooling line 302 may be connected to the first direction switching valve 410. That is, four cooling water lines may be connected to one another and meet one another in the first direction switching valve 410. The first direction switching valve 410 may be a four-way switching valve that may control a state in which the four cooling water lines are connected to or disconnected from one another.

The cooling line 302 may include an electric radiator 310, a reservoir tank 370, a second direction switching valve 320, a second cooling water pump 420, the first direction switching valve 410, the electric component 460, and a first cooling water joint 313, a second cooling water joint 312, a third cooling water pump 340, the battery 350, the chiller 252, and a third direction switching valve 330.

The electric radiator 310 may be a radiator cooling the cooling water heat-exchanged with the electric component 460 or the battery 350, and the electric radiator 310 may be an air-cooled type using a cooling fan 311.

The reservoir tank 370 may store the cooling water and replenish insufficient cooling water on the cooling water line, and the reservoir tank 370 may be installed on the cooling water line in front of the second cooling water pump 420 and the third cooling water pump 340 in the direction in which the cooling water flows.

The second direction switching valve 320 may be installed on the cooling line 302, and two cooling water pipes may be connected to the second direction switching valve 320. The first direction switching valve 410 and the second direction switching valve 320 may be connected to the first connection line 302-1 so that the heating line 301 and the cooling line 302 are connected to each other. That is, three cooling water lines may be connected to one another and meet one another in the second direction switching valve 320. The second direction switching valve 320 may be a three-way switching valve that may control a state in which the three cooling water lines are connected to or disconnected from one another.

The second cooling water pump 420 may serve to pump the cooling water so that the cooling water is circulated through the cooling line 302. In addition, the second cooling water pump 420 may be installed on the first connection line 302-1 between the first direction switching valve 410 and the second direction switching valve 320, and the second cooling water pump 420 may be operated to allow the cooling water to flow from the second direction switching valve 320 to the first direction switching valve 410.

The first directional valve 410 is the same as that described in the heating line 301 above.

The electric component 460 may be disposed on the second connection line 302-2 connecting the first direction switching valve 410 and the second cooling water joint 312 with each other, and the electric component 460 may be cooled by the cooling water. In addition, the electric component 460 may be a drive motor, an inverter, an onboard charger (OBC), or the like.

The third cooling water pump 340 may serve to pump the cooling water so that the cooling water is circulated through the cooling line 302. In addition, the third cooling water pump 340 may be installed on the cooling water line between the first cooling water joint 313 and the battery 350, and the cooling water may flow from the third cooling water pump 340 to the battery 350.

The battery 350 is a power source of the vehicle and may be a driving source of the various electric components 460 in the vehicle. Alternatively, the battery 350 may be connected to the fuel cell to serve to store electricity or store electricity supplied from the outside. In addition, the battery 350 may be disposed on the cooling water line between the third cooling water pump 340 and the third direction switching valve 330. Therefore, the battery 350 may be cooled or heated by being heat-exchanged with the flowing cooling water.

The first cooling water joint 313 may be installed on the cooling water line behind the second direction switching valve 320 in the direction in which the cooling water flows, and connected thereto so that the three cooling water lines meet one another. That is, the first cooling water joint 313 may be installed so that the two sides thereof are connected to each other on the cooling line 302, and a third connection line 302-3 may be connected to a lower side thereof. Here, the third connection line 302-3 may be connected to the first cooling water joint 313 to pass through chiller 252.

The second cooling water joint 312 may be installed at a point where a rear end of the second connection line 302-2 meets the cooling line 302, and connected thereto so that three cooling water lines meet one another at the second cooling water joint 312. That is, the second cooling water joint 312 may be installed so that the two sides thereof are connected to each other on the cooling line 302, and a second connection line 302-2 may be connected to an upper side of the second cooling water joint 312.

The chiller 252 is the same as that described in the refrigerant circulation line 200 above.

The third direction switching valve 330 may be installed on the cooling water line between the battery 350 and the second cooling water joint 312, two cooling water pipes may be connected to the third direction switching valve 330, and the third connection line 302-3 may be connected to an upper side of the third direction switching valve 330, such that the battery 350 and the third connection line 302-3 are connected in parallel with each other. Here, the second direction switching valve 320 may be a three-way switching valve that may control a state in which the three cooling water lines are connected to or disconnected from one another.

In addition, the blower 152 for blowing air may be installed on one side of the air conditioner 150, and a temperature control door 151 may be installed inside the air conditioner 150. In addition, the water-cooled type evaporator 242 and the heater core 440 disposed in the air conditioner may be disposed and configured in such a manner that air discharged from the blower 152 based on an operation of the temperature control door 151 flows into the interior after passing only the water-cooled type evaporator 242, or air passes through the water-cooled type evaporator 242 and then the heater core 440 to flow into the interior.

Therefore, the heat management system of the present invention may not only manage the cooling and heating of a vehicle but also efficiently manage the heat of the electric component and the battery in the vehicle. In addition, a pressure drop of the refrigerant may be minimized in a heat pump mode to increase the pressure of the refrigerant flowing into the compressor, thereby improving its heat pump performance and system efficiency.

Hereinafter, the description describes an operation of the heat management system based on its operation mode according to an exemplary embodiment of the present invention described above.

1. In Maximum Cooling Mode

Figure 2:
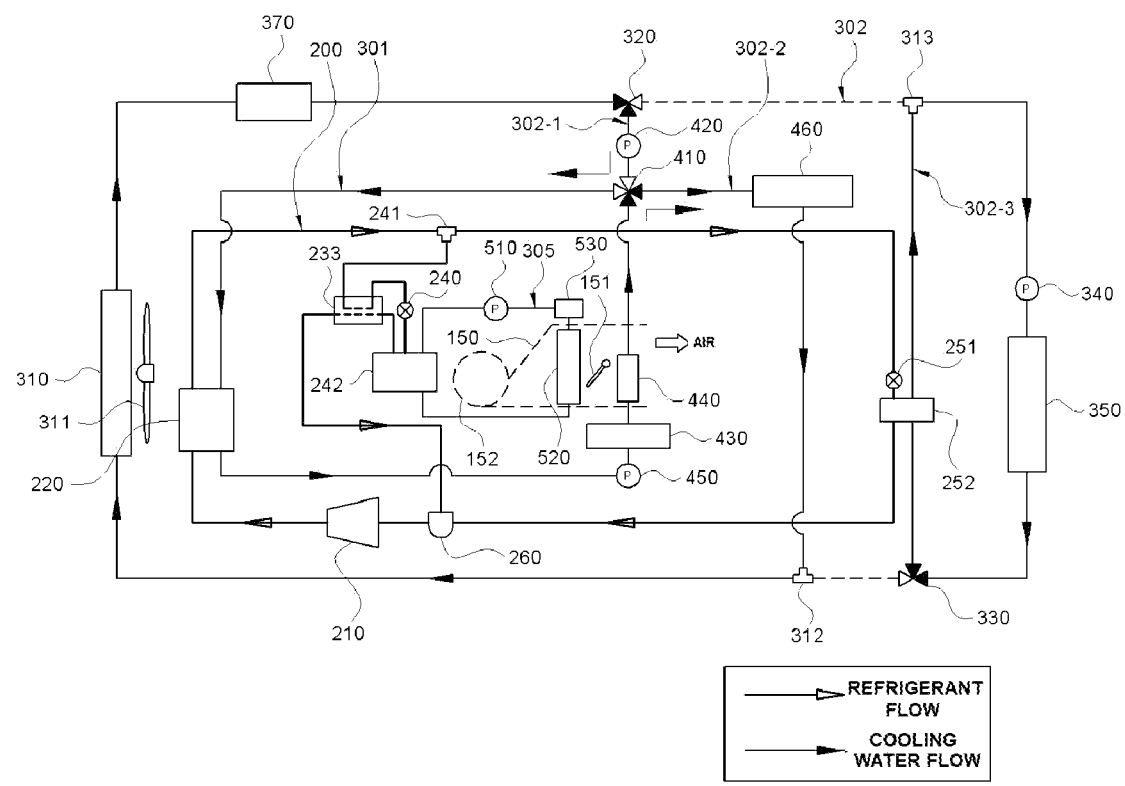
FIG. 2 is a block diagram showing a state in which the heat management system is operated in a maximum cooling mode according to an exemplary embodiment of the present invention.

FIG. 2 is a block diagram showing a state in which the heat management system is operated in a maximum cooling mode according to an exemplary embodiment of the present invention.

Referring to FIG. 2, the compressor 210 may be operated on the refrigerant circulation line 200, and the high-temperature, high-pressure refrigerant may be discharged from the compressor 210. In addition, the refrigerant discharged from the compressor 210 may be cooled by being heat-exchanged with the cooling water in the water-cooled type condenser 220. Next, the refrigerant cooled and condensed in the water-cooled type condenser 220 may be branched from the refrigerant branch 241, a portion of the refrigerant may pass through the refrigerant heat exchanger 233, and then throttled while passing through the first expansion valve 240, such that the refrigerant may be expanded. The expanded refrigerant may then be heat-exchanged with the cooling water of the air conditioning line 305 while passing through the water-cooled type evaporator 242, and the cooling water of the air conditioning line 305 may be cooled by the refrigerant. In addition, the refrigerant evaporated in the water-cooled type evaporator 242 may be heat-exchanged with the refrigerant before flowing into the first expansion valve 240 while passing through the refrigerant heat exchanger 233, pass through the accumulator 260, and then flow back to the compressor 210. In addition, the other portion of the refrigerant branched from the refrigerant branch 241 may be throttled while passing through the second expansion valve 251, such that the refrigerant may be expanded. Then, the expanded refrigerant may be heat-exchanged with the cooling water while passing through the chiller 252, and the cooling water may be cooled as the refrigerant is evaporated. In addition, the refrigerant evaporated from the chiller 252 may pass through the accumulator 260 and flow back into the compressor 210. In this way, the refrigerant passing through the water-cooled type evaporator 242 and the refrigerant passing through the chiller 252 may merge together at the accumulator 260 and flow into the compressor 210. The refrigerant may then be circulated by repeating the process as described above.

In addition, in the air conditioning line 305, the cooling water may be circulated by an operation of the fourth cooling water pump 510. In addition, air may be cooled by being heat-exchanged with air blown by the blower 152 of the air conditioner 150 as the cooling water passes through the cabin cooler 520, and the cooled air may be supplied to the vehicle interior to cool the interior.

Meanwhile, the cooling water of the cooling water circulation line 300 may be circulated by the operations of the first cooling water pump 450, the second cooling water pump 420 and the third cooling water pump 340. In addition, the refrigerant passing through the water-cooled type condenser 220, the electric component 460, and the battery 350 may be cooled by the cooling water, and the heated cooling water may be cooled by being heat-exchanged with outside air by an operation of the cooling fan 311 in the electric radiator 310. Here, the first direction switching valve 410 and the second direction switching valve 320 may be adjusted in a direction in which the heating line 301 and the cooling line 302 are connected to each other. In more detail, upper and left sides of the first direction switching valve 410 may be connected to each other to circulate the cooling water, and lower and right sides thereof may be connected to each other to circulate the cooling water. In addition, left and lower sides of the second direction switching valve 320 may be connected to each other to circulate the cooling water, and a right side thereof may be disconnected therefrom. In addition, upper and right sides of the third direction switching valve 330 may be connected to each other and a left side thereof may be disconnected therefrom.

Therefore, the cooling water may repeat its circulation cycle by sequentially passing through the electric radiator 310, the reservoir tank 370, the second direction switching valve 320, the second cooling water pump 420, the first direction switching valve 410, the water-cooled type condenser 220, the first cooling water pump 450, the cooling water heater 430, the heater core 440, the first direction switching valve 410, the electric component 460, and the second cooling water joint 312, and then flowing back into the electric radiator 310. Here, the cooling water may not flow from the second direction switching valve 320 to the first cooling water joint 313 by the second direction switching valve 320, and the cooling water may not flow from the third direction switching valve 330 to the second cooling water joint 312 by the third direction switching valve 330. In addition, the cooling water may repeat its circulation cycle by sequentially passing through the chiller 252, the first cooling water joint 313, the third cooling water pump 340, the battery 350, the third direction switching valve 330, and then flowing back into the chiller 252. That is, the battery 350 may be separately cooled. The reason is that a cooling line for the battery 350 and chiller 252 may be formed as a separate closed loop through which the cooling water is circulated by the second direction switching valve 320 and the third direction switching valve 330.

Here, the maximum cooling mode may be operated when a temperature of the outside air is in the range of 30 degrees Celsius to 45 degrees Celsius, and the compressor 210 may here be rotated at the maximum rotational speed. In addition, when the battery 350 is not necessary to be cooled, the second expansion valve 251 may be blocked and the refrigerant may not flow toward the chiller 252, and the third cooling water pump 340 may not be operated.

2. In Mild Cooling Mode

Figure 3:
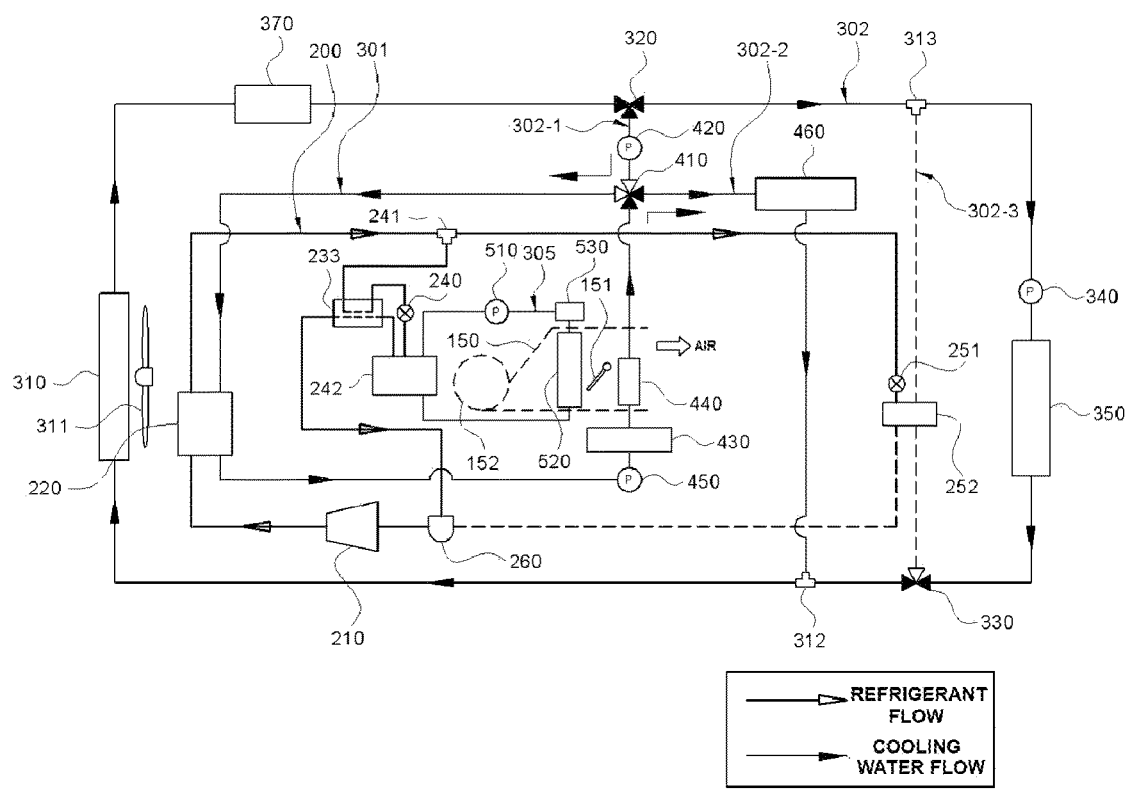
FIG. 3 is a block diagram showing a state in which the heat management system is operated in a mild cooling mode according to an exemplary embodiment of the present invention.

FIG. 3 is a block diagram showing a state in which the heat management system is operated in a mild cooling mode according to an exemplary embodiment of the present invention.

Referring to FIG. 3, the compressor 210 may be operated on the refrigerant circulation line 200, and the high-temperature, high-pressure refrigerant may be discharged from the compressor 210. In addition, the refrigerant discharged from the compressor 210 may be cooled by being heat-exchanged with the cooling water in the water-cooled type condenser 220. Next, the refrigerant cooled and condensed in the water-cooled type condenser 220 may pass through the refrigerant branch 241, pass through the refrigerant heat exchanger 233, and may then be throttled while passing through the first expansion valve 240, such that the refrigerant may be expanded. The expanded refrigerant may then be heat-exchanged with the cooling water of the air conditioning line 305 while passing through the water-cooled type evaporator 242, and the cooling water of the air conditioning line 305 may be cooled by the refrigerant. In addition, the refrigerant evaporated in the water-cooled type evaporator 242 may be heat-exchanged with the refrigerant before flowing into the first expansion valve 240 while passing through the refrigerant heat exchanger 233, pass through the accumulator 260, and then flow into the compressor 210. Here, the second expansion valve 251 may be blocked and the refrigerant may not flow through the chiller 252. In this way, the refrigerant passing through the water-cooled type evaporator 242 may pass through the accumulator 260, and flow into the compressor 210. The refrigerant may then be circulated by repeating the process as described above.

In addition, in the air conditioning line 305, the cooling water may be circulated by the operation of the fourth cooling water pump 510. In addition, air may be cooled by being heat-exchanged with air blown by the blower 152 of the air conditioner 150 as the cooling water passes through the cabin cooler 520, and the cooled air may be supplied to the vehicle interior to cool the interior.

Meanwhile, the cooling water of the cooling water circulation line 300 may be circulated by the operations of the first cooling water pump 450, the second cooling water pump 420 and the third cooling water pump 340. In addition, the refrigerant passing through the water-cooled type condenser 220, the electric component 460, and the battery 350 may be cooled by the cooling water, and the heated cooling water may be cooled by being heat-exchanged with the outside air by the operation of the cooling fan 311 in the electric radiator 310. Here, the first direction switching valve 410 and the second direction switching valve 320 may be adjusted in a direction in which the heating line 301 and the cooling line 302 are connected to each other. In more detail, the upper and left sides of the first direction switching valve 410 may be connected to each other to circulate the cooling water, and the lower and right sides thereof may be connected to each other to circulate the cooling water. In addition, the left, lower and right sides of the second direction switching valve 320 may be all connected to one another to circulate the cooling water. In addition, the left and right sides of the third direction switching valve 330 may be connected to each other and the upper side thereof may be disconnected therefrom.

Therefore, the cooling water may repeat its circulation cycle by sequentially passing through the electric radiator 310, the reservoir tank 370, the second direction switching valve 320, the second cooling water pump 420, the first direction switching valve 410, the water-cooled type condenser 220, the first cooling water pump 450, the cooling water heater 430, the heater core 440, the first direction switching valve 410, the electric component 460, and the second cooling water joint 312, and then flowing back into the electric radiator 310. Here, a portion of the cooling water may flow in a right direction by the second direction switching valve 320, and repeat its circulation cycle by sequentially passing through the first cooling water joint 313, the third cooling water pump 340, the battery 350, the third direction switching valve 330 and the second cooling water joint 312, and then flowing back into the electric radiator 310. Here, the cooling water passing through the electric component 460 and the cooling water passing through the battery 350 may merge together at the second cooling water joint 312 and flow into the electric radiator 310.

Here, the mild cooling mode may be operated when the temperature of the outside air is in the range of 15 degrees Celsius to 25 degrees Celsius, and the battery may here be cooled by the electric radiator, such that the refrigerant may not be circulated toward the chiller. Therefore, it is possible to reduce power consumed in driving the compressor.

3. In Maximum Heating Mode

Figure 4:
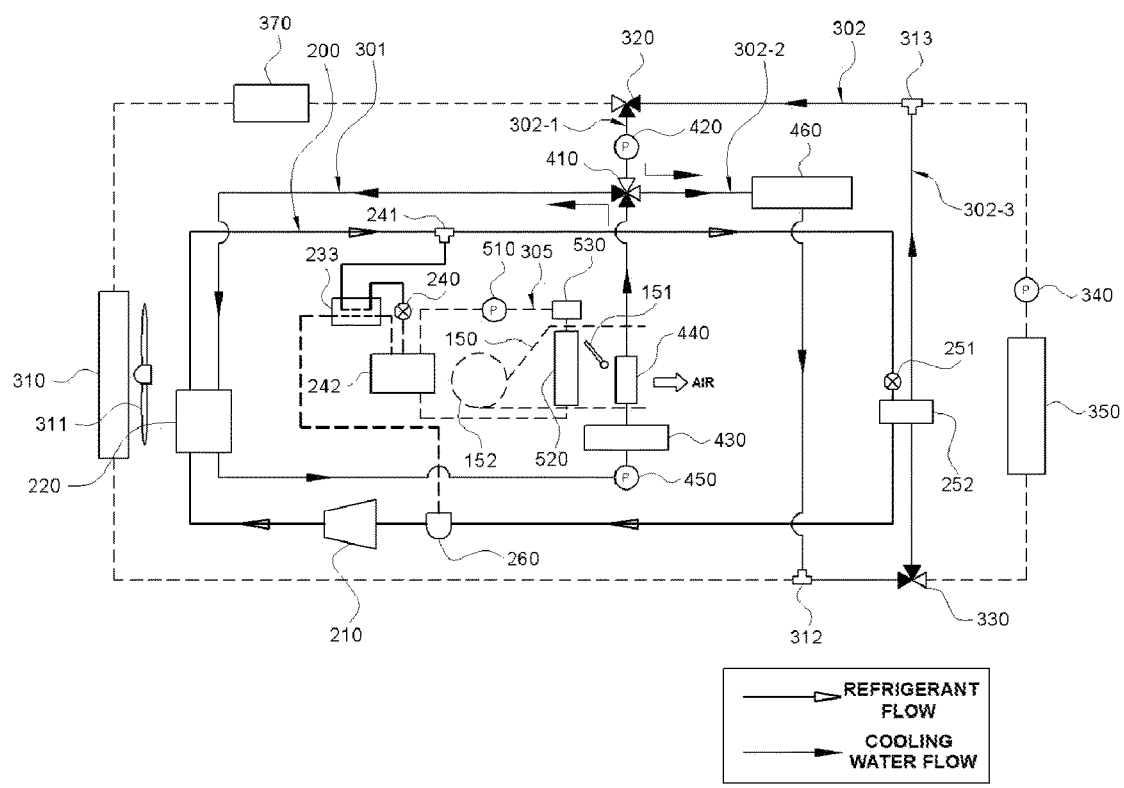
FIG. 4 is a block diagram showing a state in which the heat management system is operated in a maximum heating mode according to an exemplary embodiment of the present invention.

FIG. 4 is a block diagram showing a state in which the heat management system is operated in a maximum heating mode according to an exemplary embodiment of the present invention.

Referring to FIG. 4, the compressor 210 may be operated on the refrigerant circulation line 200, and the high-temperature, high-pressure refrigerant may be discharged from the compressor 210. In addition, the refrigerant discharged from the compressor 210 may be cooled by being heat-exchanged with the cooling water in the water-cooled type condenser 220. Next, the refrigerant cooled in the water-cooled type condenser 220 may pass through the refrigerant branch 241, and may then be throttled while passing through pass through the second expansion valve 251, such that the refrigerant may be expanded. The expanded refrigerant may then flow into the chiller 252, the refrigerant and the cooling water may be heat-exchanged with each other in the chiller 252, and thus the cooling water may be cooled and the refrigerant may be heated. Next, the refrigerant passing through the chiller 252 may pass through the accumulator 260 and flow back into the compressor 210. Here, first expansion valve 240 may be blocked and the refrigerant may not flow toward the water-cooled type evaporator 242. The refrigerant may then be circulated by repeating the process as described above.

In addition, the fourth cooling water pump 510 may not be operated on the air conditioning line 305, and thus the cooling water may not flow through the air conditioning line 305.

Meanwhile, the cooling water of the cooling water circulation line 300 may be circulated by the operations of the first cooling water pump 450 and the second cooling water pump 420. In addition, the cooling water may be heated while passing through the water-cooled type condenser 220, may be heated by the cooling water heater 430, may be heated by waste heat from the electric component 460, and may be cooled while passing through the chiller 252. Here, the first direction switching valve 410 and the second direction switching valve 320 may be adjusted in a direction in which the heating line 301 and the cooling line 302 are disconnected from each other. In more detail, the upper and right sides of the first direction switching valve 410 may be connected to each other to circulate the cooling water, and the lower and left sides thereof may be connected to each other to circulate the cooling water. In addition, the right and lower sides of the second direction switching valve 320 may be connected to each other to circulate the cooling water, and the left side thereof may be disconnected therefrom. In addition, the upper and left sides of the third direction switching valve 330 may be connected to each other and the right side thereof may be disconnected therefrom.

Therefore, the cooling water on the heating line 301 may repeat its circulation cycle by sequentially passing through the first cooling water pump 450, the cooling water heater 430, the heater core 440, the first direction switching valve 410 and the water-cooled type condenser 220, and then flowing back into the first cooling water pump 450. Here, air may be heated by being heat-exchanged with air blown by the blower 152 of the air conditioner 150 as the cooling water passes through the heater core 440, and the heated air may be supplied to the vehicle interior to heat the interior. In addition, the cooling water on the cooling line 302 disconnected from the heating line 301 may repeat its circulation cycle by sequentially passing through the second cooling water pump 420, the first direction switching valve 410, the electric component 460, the second cooling water joint 312, the third direction switching valve 330, the chiller 252, the first cooling water joint 313 and the second direction switching valve 320, and then flowing back into the second cooling water pump 420. Here, the cooling water may not flow from the second direction switching valve 320 through the electric radiator 310 to the second cooling water joint 312 by the second direction switching valve 320, and the cooling water may not flow from the third direction switching valve 330 through the battery 350 and the third cooling water pump 340 to the first cooling water joint 313 by the third direction switching valve 330.

Here, the maximum heating mode may be operated when the temperature of the outside air is in the range of −20 degrees Celsius to −5 degrees Celsius, and the battery 350 may also be cooled by controlling the third direction switching valve 330 and the third cooling water pump 340.

4. In Mild Heating Mode

Figure 5:
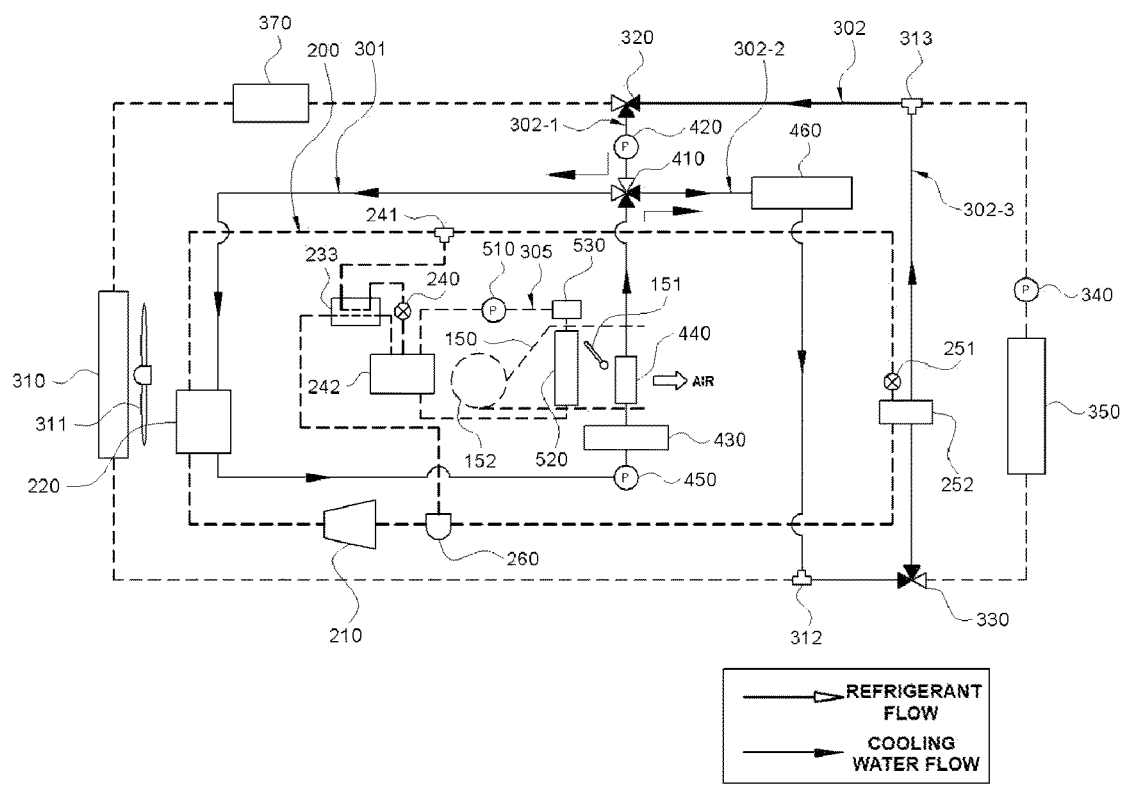
FIG. 5 is a block diagram showing a state in which the heat management system is operated in a mild heating mode according to an exemplary embodiment of the present invention.

FIG. 5 is a block diagram showing a state in which the heat management system is operated in a mild heating mode according to an exemplary embodiment of the present invention.

Referring to FIG. 5, the refrigerant circulation line 200 may not be operated, and thus the refrigerant may not be circulated therethrough.

In addition, the fourth cooling water pump 510 may not be operated on the air conditioning line 305, and thus the cooling water may not flow through the air conditioning line 305.

Meanwhile, the cooling water of the cooling water circulation line 300 may be circulated by the operations of the first cooling water pump 450 and the second cooling water pump 420. In addition, the cooling water may be heated only by the waste heat from the electric component 460. Here, the first direction switching valve 410 and the second direction switching valve 320 may be adjusted in a direction in which the heating line 301 and the cooling line 302 are connected to each other. In more detail, the upper and left sides of the first direction switching valve 410 may be connected to each other to circulate the cooling water, and the lower and right sides thereof may be connected to each other to circulate the cooling water. In addition, the right and lower sides of the second direction switching valve 320 may be connected to each other to circulate the cooling water, and the left side thereof may be disconnected therefrom. In addition, the left and upper sides of the third direction switching valve 330 may be connected to each other and the right side thereof may be disconnected therefrom.

Therefore, the cooling water may repeat its circulation cycle by sequentially passing through the second cooling water pump 420, the first direction switching valve 410, the water-cooled type condenser 220, the first cooling water pump 450, the cooling water heater 430, the heater core 440, the first direction switching valve 410, the electric component 460, the second cooling water joint 312, the third direction switching valve 330, the chiller 252, the first cooling water joint 313 and the second direction switching valve 320, and then flowing back into the second cooling water pump 420. Here, the cooling water may not flow from the third direction switching valve 330 through the battery 350 and the third cooling water pump 340 to the first cooling water joint 313 by the third direction switching valve 330, and the cooling water may not flow from the second direction switching valve 320 through the electric radiator 310 to the second cooling water joint 312 by the second direction switching valve 320. Therefore, when there is low demand for heating, the cooling water may be heated using only the waste heat from the electric component 460 and used to heat the interior.

Here, the mild heating mode may be operated when the temperature of the outside air is in the range of 5 degrees Celsius to 15 degrees Celsius.

5. In Battery Heating Mode

Figure 6:
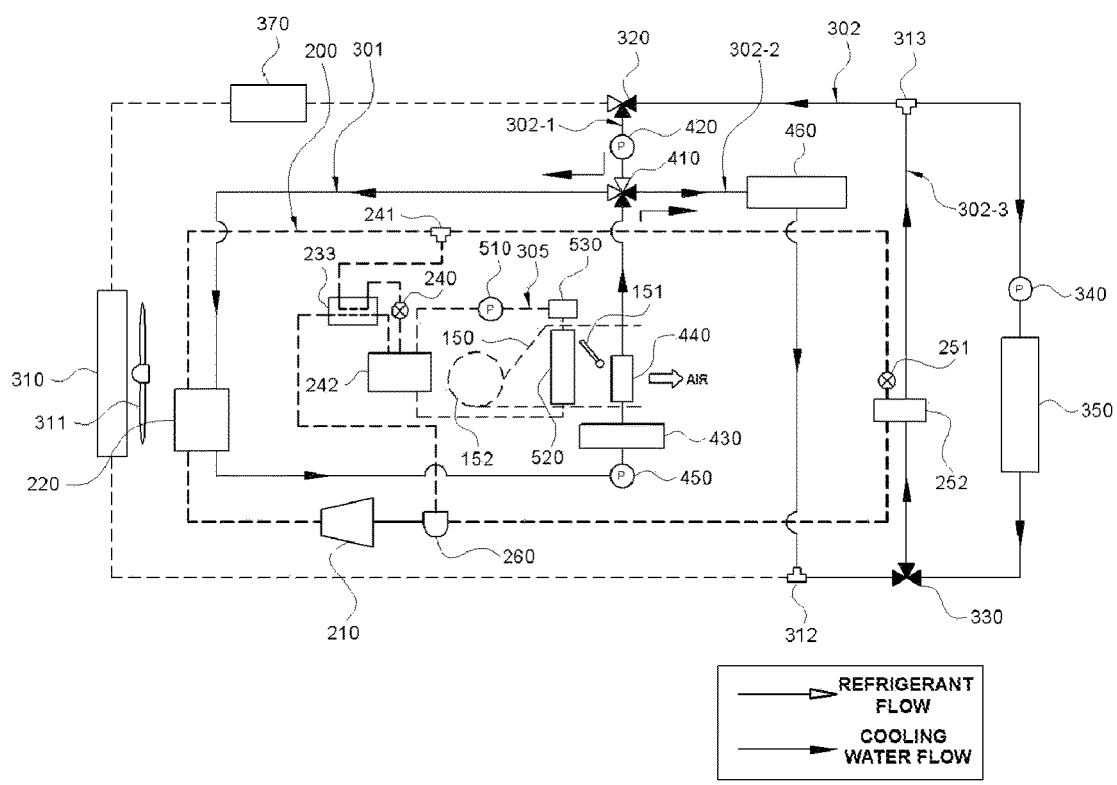
FIG. 6 is a block diagram showing a state in which the heat management system is operated in a battery heating mode according to an exemplary embodiment of the present invention.

FIG. 6 is a block diagram showing a state in which the heat management system is operated in a battery heating mode according to an exemplary embodiment of the present invention.

Referring to FIG. 6, the refrigerant circulation line 200 may not be operated, and thus the refrigerant may not be circulated therethrough.

In addition, the fourth cooling water pump 510 may not be operated on the air conditioning line 305, and thus the cooling water may not flow through the air conditioning line 305.

Meanwhile, the cooling water of the cooling water circulation line 300 may be circulated by the operations of the first cooling water pump 450, the second cooling water pump 420 and the third cooling water pump 340. In addition, the cooling water may be heated by the waste heat from the cooling water heater 430 and the electric component 460. Here, the first direction switching valve 410 and the second direction switching valve 320 may be adjusted in a direction in which the heating line 301 and the cooling line 302 are connected to each other. In more detail, the upper and left sides of the first direction switching valve 410 may be connected to each other to circulate the cooling water, and the lower and right sides thereof may be connected to each other to circulate the cooling water. In addition, the right and lower sides of the second direction switching valve 320 may be connected to each other to circulate the cooling water, and the left side thereof may be disconnected therefrom. In addition, the upper, right and left sides of the third direction switching valve 330 may be all connected to one another.

Therefore, the cooling water may repeat its circulation cycle by sequentially passing through the second cooling water pump 420, the first direction switching valve 410, the water-cooled type condenser 220, the first cooling water pump 450, the cooling water heater 430, the heater core 440, the first direction switching valve 410, the electric component 460, the second cooling water joint 312, the third direction switching valve 330, the chiller 252, the first cooling water joint 313 and the second direction switching valve 320, and then flowing back into the second cooling water pump 420. Here, the cooling water passing through the battery 350 may merge together at the third direction switching valve 330 and flow upward, and may then be branched on two sides at the first cooling water joint 313. Here, the cooling water may not flow from the second direction switching valve 320 through the electric radiator 310 to the second cooling water joint 312 by the second direction switching valve 320. Therefore, the heated cooling water may heat the battery 350, and an initial performance of the battery 350 may be quickly improved in winter when the outside temperature is low.

Here, the battery heating mode may be operated when the temperature of the outside air is in the range of −20 degrees Celsius to −5 degrees Celsius.

7. In Dehumidifying and Heating Mode

Figure 7:
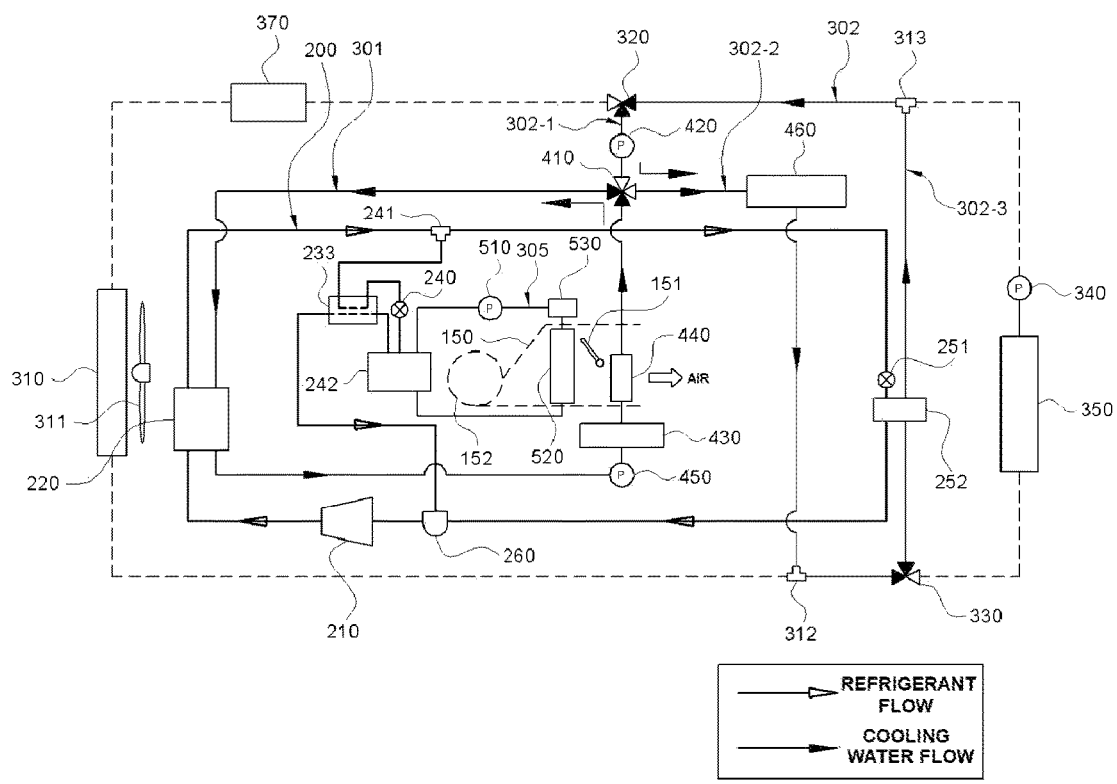
FIG. 7 is a block diagram showing a state in which the heat management system is operated in a dehumidifying and heating mode according to an exemplary embodiment of the present invention.

FIG. 7 is a block diagram showing a state in which the heat management system is operated in a dehumidifying and heating mode according to another exemplary embodiment of the present invention.

Referring to FIG. 7, the compressor 210 may be operated on the refrigerant circulation line 200, and the high-temperature, high-pressure refrigerant may be discharged from the compressor 210. In addition, the refrigerant discharged from the compressor 210 may be cooled by being heat-exchanged with the cooling water in the water-cooled type condenser 220. Next, the refrigerant cooled and condensed in the water-cooled type condenser 220 may be branched from the refrigerant branch 241, pass through the refrigerant heat exchanger 233, and may then be throttled while passing through the first expansion valve 240, such that the refrigerant may be expanded. The expanded refrigerant may then be heat-exchanged with the cooling water of the air conditioning line 305 while passing through the water-cooled type evaporator 242, and the cooling water of the air conditioning line 305 may be cooled by the refrigerant. In addition, the refrigerant passing through the water-cooled type evaporator 242 may pass through the refrigerant heat exchanger 233, pass through the accumulator 260, and then flow back to the compressor 210. In addition, the other portion of the refrigerant branched from the refrigerant branch 241 may be throttled while passing through the second expansion valve 251, such that the refrigerant may be expanded. Then, the expanded refrigerant may be heat-exchanged with the cooling water while passing through the chiller 252, and thus the cooling water may be cooled and the refrigerant may be heated. Next, the refrigerant may pass through the chiller 252 and merge together at the accumulator 260 and flow into the compressor 210. The refrigerant may then be circulated by repeating the process as described above.

In addition, in the air conditioning line 305, the cooling water may be circulated by the operation of the fourth cooling water pump 510. In addition, air may be dehumidified as the cooling water is heat-exchanged with air blown by the blower 152 of the air conditioner 150 while passing through the cabin cooler 520.

Meanwhile, the cooling water of the cooling water circulation line 300 may be circulated by the operations of the first cooling water pump 450 and the second cooling water pump 420. In addition, the cooling water may be heated by being heat-exchanged with the refrigerant while passing through the water-cooled type condenser 220, and may be further heated while passing through the cooling water heater 430 to be used to heat the interior. Here, the first direction switching valve 410 and the second direction switching valve 320 may be adjusted in the direction in which the heating line 301 and the cooling line 302 are disconnected from each other. In more detail, the upper and right sides of the first direction switching valve 410 may be connected to each other to circulate the cooling water, and the lower and left sides thereof may be connected to each other to circulate the cooling water. In addition, the right and lower sides of the second direction switching valve 320 may be connected to each other to circulate the cooling water, and the left side thereof may be disconnected therefrom. In addition, the left and upper sides of the third direction switching valve 330 may be connected to each other and the right side thereof may be disconnected therefrom.

Therefore, the cooling water on the heating line 301 may repeat its circulation cycle by sequentially passing through the first cooling water pump 450, the cooling water heater 430, the heater core 440, the first direction switching valve 410 and the water-cooled type condenser 220, and then flowing back into the first cooling water pump 450. In addition, the cooling water on the cooling line 302 disconnected from the heating line 301 may repeat its circulation cycle by sequentially passing through the second cooling water pump 420, the first direction switching valve 410, the electric component 460, the second cooling water joint 312, the third direction switching valve 330, the chiller 252, the first cooling water joint 313 and the second direction switching valve 320, and then flowing back into the second cooling water pump 420. Here, the cooling water may not flow from the third direction switching valve 330 through the battery 350 and the third cooling water pump 340 to the first cooling water joint 313 by the third direction switching valve 330, and the cooling water may not flow from the second direction switching valve 320 through the electric radiator 310 to the second cooling water joint 312 by the second direction switching valve 320. Here, air dehumidified while passing through the water-cooled type evaporator 242 may be heated while passing through the heater core 440, and may then be supplied to the interior to be used to heat the interior.

Here, the dehumidifying and heating mode may be operated when the temperature of the outside air is in the range of 5 degrees Celsius to 15 degrees Celsius.

Figure 8:
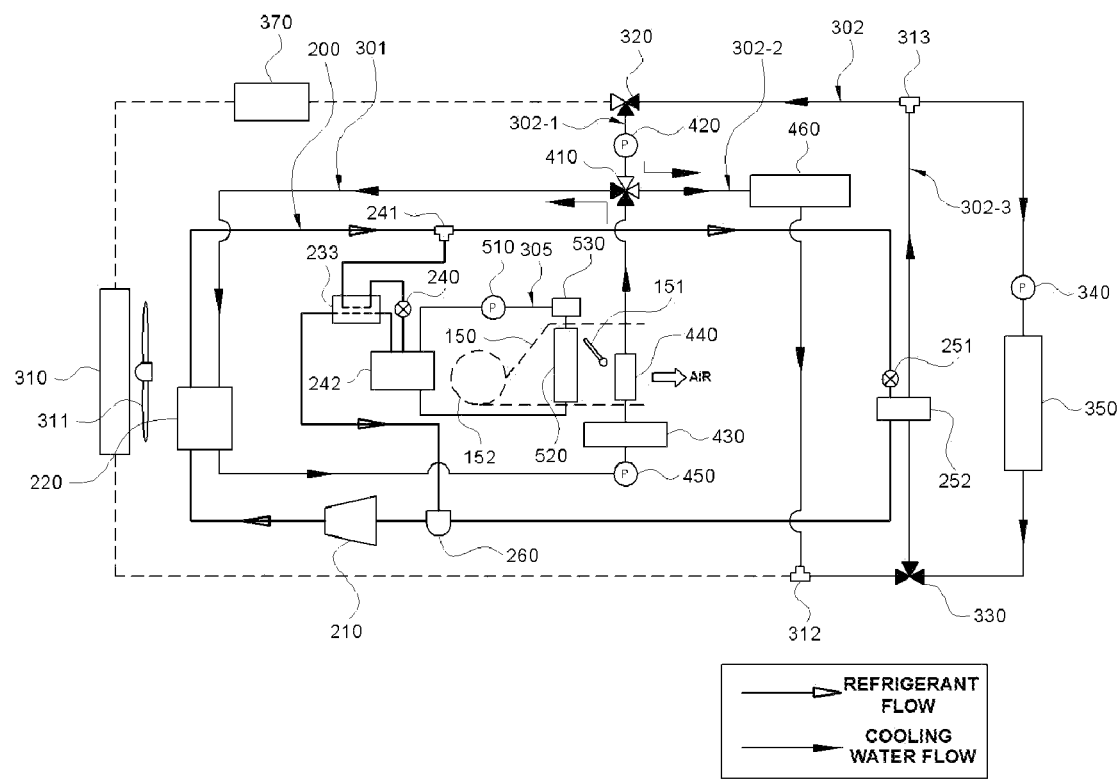
FIG. 8 is a block diagram showing a state in which the heat management system is operated in a dehumidifying and heating mode according to another exemplary embodiment of the present invention.

FIG. 8 is a block diagram showing a state in which the heat management system is operated in a dehumidifying and heating mode according to another exemplary embodiment of the present invention.

Referring to FIG. 8, waste heat from the battery 350 may be further used as a heat source for heating the interior when dehumidifying and heating air. That is, FIG. 7 shows that the left and upper sides of the third direction switching valve 330 are connected to each other, and the right side is disconnected therefrom. However, FIG. 8 shows that the left, upper and right sides of the third direction switching valve 330 are all connected to one another, and the third cooling water pump 340 is operated to allow the cooling water to pass through the battery 350. Therefore, the cooling water passing through the electric component 460 and the cooling water passing through the battery 350 may merge together at the third direction switching valve 330, flow upwards along the third connection line 302-3, pass through the chiller 252, then be branched at the first cooling water joint 313. A portion of the cooling water may then flow to the second direction switching valve 320, and the other portion thereof may flow to the third cooling water pump 340. In this way, the cooling water may repeat its circulation cycle.

Figure 9:
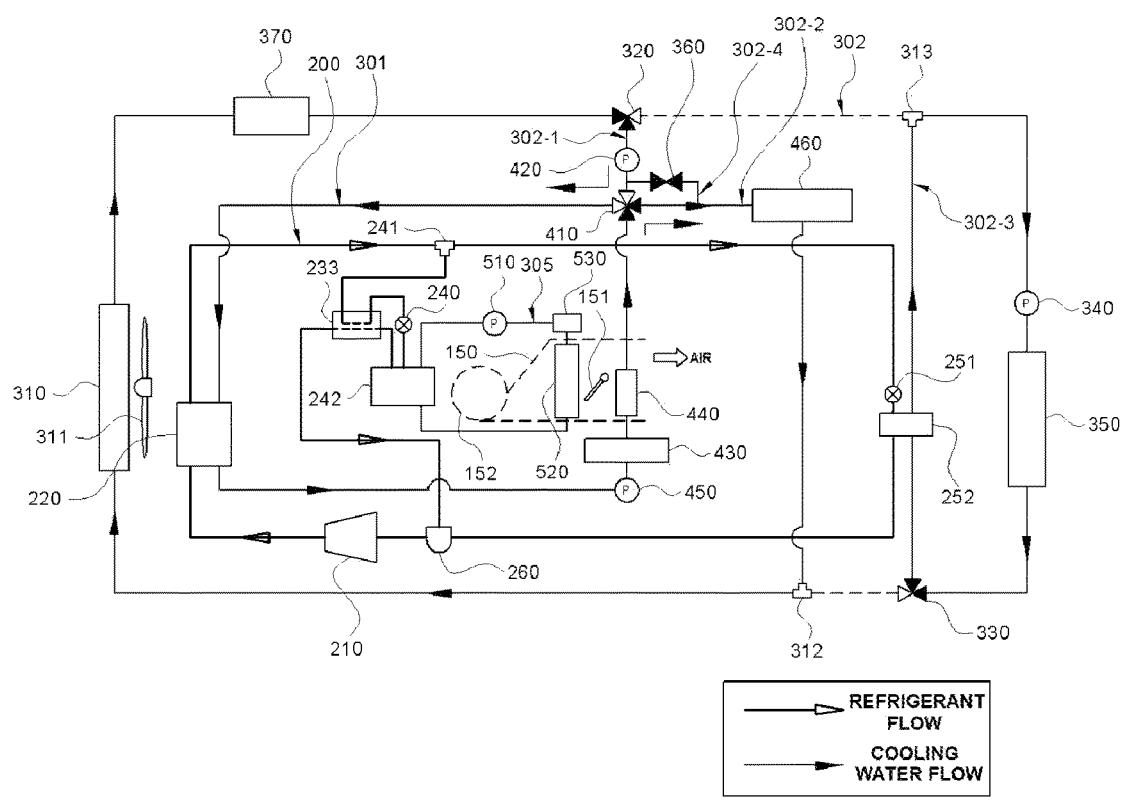
FIG. 9 is a block diagram showing a heat management system according to another exemplary embodiment of the present invention.

FIG. 9 is a block diagram showing a heat management system according to another exemplary embodiment of the present invention.

Referring to FIG. 9, a fourth connection line 302-4 connecting the first connection line 302-1 and the second connection line 302-2 with each other may be further formed on the cooling line 302, and a shut-off valve 360 may be installed on the fourth connection line 302-4, such that the shut-off valve 360 may be disposed in parallel with the first direction switching valve 410.

Therefore, the electric component 460 may be normally cooled using the flow of cooling water in a state in which the shut-off valve 360 is shut off, and the electric component 460 may be cooled using the cooler cooling water by opening the shut-off valve 360 when there is high demand for cooling the electric component 460.

In addition, a cooling water temperature sensor may be installed adjacent to the front of the electric component 460 in the direction in which the cooling water flows, and the cooling of the electric component 460 may be controlled by controlling the opening and closing of the shut-off valve 360 based on the temperature of the cooling water measured by the cooling water temperature sensor.

Figure 10:
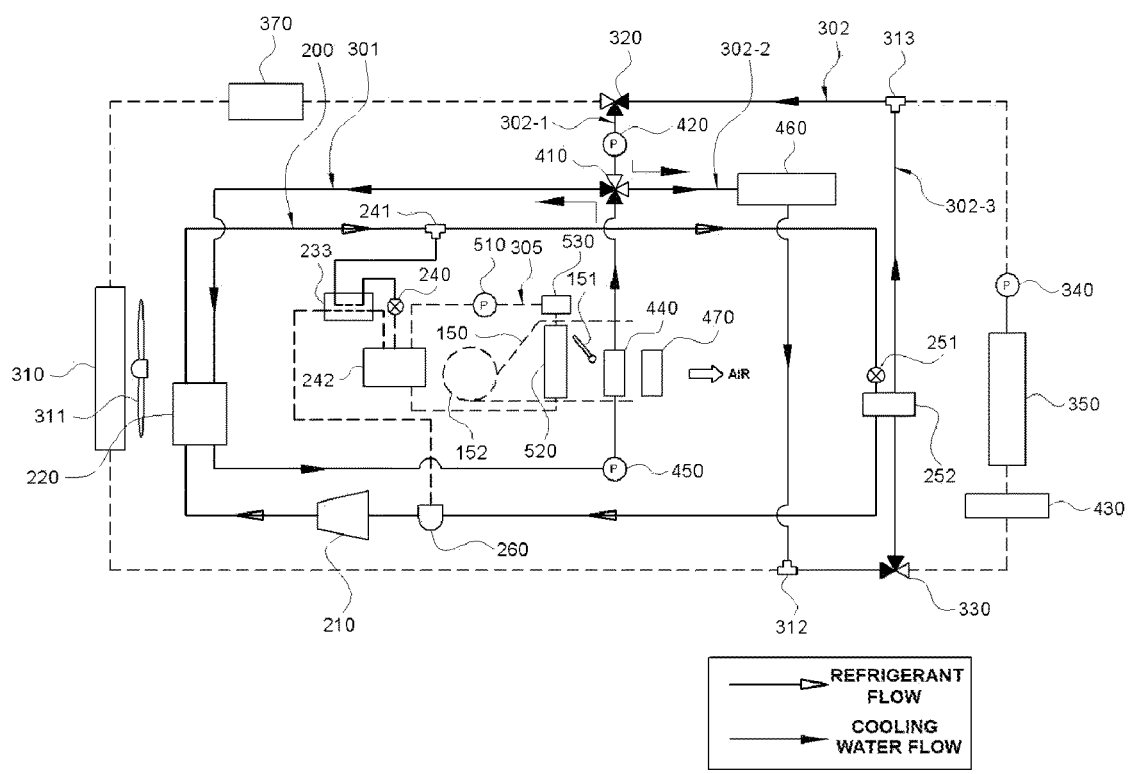
FIGS. 10 to 12 are block diagrams each showing a heat management system according to yet another exemplary embodiment of the present invention.
Figure 11:
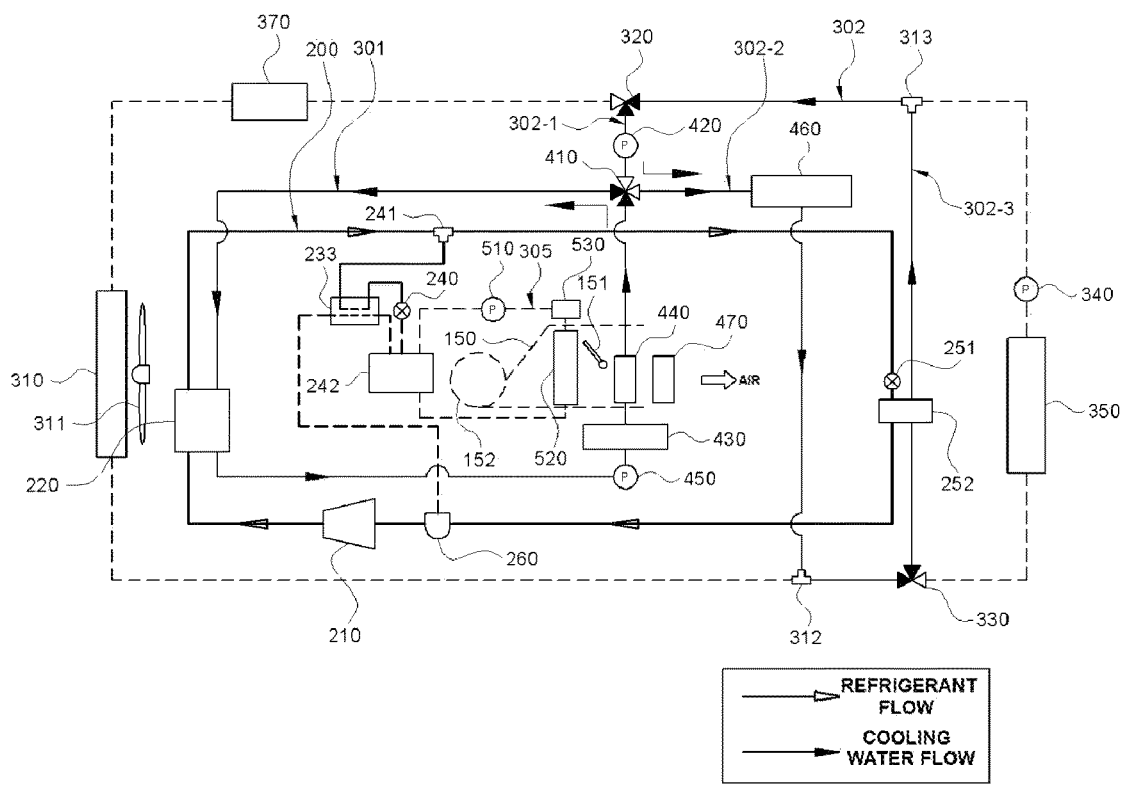
Figure 12:
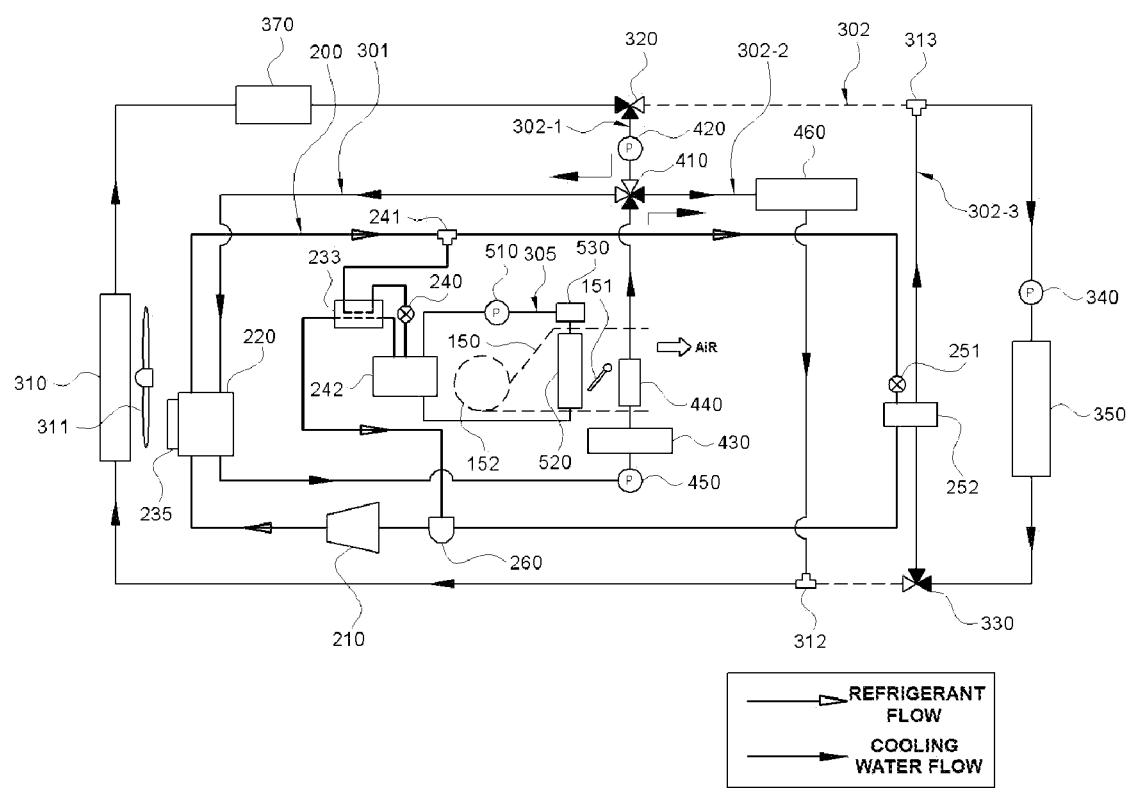

FIGS. 10 to 12 are block diagrams each showing a heat management system according to yet another exemplary embodiment of the present invention.

Referring to FIG. 10, the heat management system according to the present invention may further include an air-heated type heater 470 formed separately from the heating line 301 and heating the interior by directly heating air flowing into the interior. That is, the air-heated type heater 470 may be disposed adjacent to the heater core 440, and the air-heated type heater 470, for example, may be implemented in the PTC heater operated by electricity, such that air may be quickly heated. It is thus possible to rapidly increase an effect of heating the interior. Here, the cooling water preheated by the cooling water heater 430 may flow into the heater core 440. The air-heated type heater 470 may thus use a low-voltage PTC heater having a smaller heating capacity, and implemented at a lower price than a high-voltage PTC heater.

Alternatively, referring to FIG. 11, when the air-heated type heater 470 is disposed adjacent to the heater core 440, the cooling water heater 430 may be installed on the cooling line 302 adjacent to the battery 350 rather than the heating line 301. Therefore, the air-heated type heater may be used to heat the interior and the separate cooling water heater may be used to heat the battery, thereby increasing the efficiency and enabling the battery to be separately controlled.

In addition, referring to FIG. 12, the water-cooled type condenser 220 may further include a gas-liquid separator 235. For example, the gas-liquid separator 235 may be connected to the water-cooled type condenser 220 in the middle of a flow path of the refrigerant passing through the water-cooled type condenser 220. In this way, an area of the water-cooled type condenser 220 before the refrigerant passes through the gas-liquid separator 235 may become a condensation area, and an area of the water-cooled type condenser 220 before the refrigerant passes through the gas-liquid separator 235 may become a subcooling area. Therefore, the refrigerant may be condensed in the condensation area of the water-cooled type condenser 220, the gas refrigerant and the liquid refrigerant may be separated from each other while the refrigerant passes through the gas-liquid separator 235 in a state in which the liquid refrigerant and the gas refrigerant are mixed together. Only the liquid refrigerant may then flow into the subcooling area of the water-cooled type condenser 220, and the refrigerant may be supercooled in the subcooling area. Accordingly, it is possible to maximize the performance of the water-cooled type condenser.

The present invention is not limited to the abovementioned exemplary embodiments, and may be variously applied. In addition, the present invention may be variously modified by those skilled in the art to which the present invention pertains without departing from the gist of the present invention claimed in the claims.

DESCRIPTION OF REFERENCE NUMERALS

150: air conditioner, 151: temperature control door
152: blower
200: refrigerant circulation line, 210: compressor
220: water-cooled type condenser, 233: refrigerant heat exchanger
235: gas-liquid separator
240: first expansion valve, 241: refrigerant branch
242: water-cooled type evaporator, 251: second expansion valve
252: chiller, 260: accumulator
300: cooling water circulation line, 301: heating line
302: cooling line, 302-1: first connection line
302-2: second connection line, 302-3: third connection line
305: cooling line
310: electric radiator, 311: cooling fan
312: second cooling water joint, 313: first cooling water joint
320: second direction switching valve, 330: third direction switching valve
340: third cooling water pump, 350: battery
360: shut-off valve, 370: reservoir tank
410: first direction switching valve, 420: second cooling water pump
430: cooling water heater, 440: heater core
450: first cooling water pump, 460: electric component
470: air-heated type heater, 510: fourth cooling water pump
520: cabin cooler, 530: reservoir tank

The invention claimed is:
1. A heat management system comprising:
a refrigerant circulation line including a compressor compressing and discharging a refrigerant, a water-cooled type condenser condensing the compressed refrigerant using cooling water, a first expansion valve expanding the condensed refrigerant, and a water-cooled type evaporator evaporating the expanded refrigerant using the cooling water;

a heating line including a heater core generating conditioned air for heating by circulating the cooling water heat-exchanged through the water-cooled type condenser;

an air conditioning line including a cabin cooler generating conditioned air for cooling by circulating the cooling water heat-exchanged through the water-cooled type evaporator; and a cooling line connected to or disconnected from the heating line to cool a battery and an electric component based on a cooling/heating mode, wherein the air conditioning line includes the cabin cooler cooling an interior by using air cooled by allowing the cooling water heat-exchanged with the refrigerant through the water-cooled evaporator and air flowing into the interior to be heat-exchanged with each other, and a fourth cooling water pump connected between the water-cooled type evaporator and the cabin cooler, and the cooling water line on which the water-cooled type evaporator, the fourth cooling water pump, and the cabin cooler are connected to one another forms a closed loop.

2. The heat management system of claim 1, further comprising an air conditioner including a blower blowing air into the interior, wherein the water-cooled type evaporator and the fourth cooling water pump are disposed outside the air conditioner, and the cabin cooler is disposed inside the air conditioner.

3. The heat management system of claim 1, wherein the air conditioning line further includes a reservoir tank connected between the fourth cooling water pump and the cabin cooler.

4. The heat management system of claim 1, wherein a refrigerant heat exchanger allows the refrigerant flowing into the first expansion valve and the refrigerant discharged from the water-cooled type evaporator to be heat-exchanged with each other in the cooling mode, and does not allow the refrigerant flowing into the first expansion valve and the refrigerant discharged from the water-cooled evaporator to be heat-exchanged with each other in the heating mode.

5. The heat management system of claim 1, wherein the cooling line includes a first connection line 1 branched from one side of the cooling line and connected to the heating line, and a second connection line branched from the other side of the cooling line and connected to the heating line.

6. The heat management system of claim 5, wherein the first connection line 1, the second connection line, and the heating line are connected to a first direction switching valve, and the cooling line and the heating line are connected to or disconnected from each other by the first direction switching valve.

7. The heat management system of claim 6, wherein the electric component is disposed on the second connection line.

8. The heat management system of claim 7, wherein the cooling line further includes a fourth connection line connecting the first connection line and the second connection line with each other, and a shut-off valve installed on the fourth connection line and disposed in parallel with the first direction switching valve.

9. The heat management system of claim 8, wherein the cooling line further includes a cooling water temperature sensor installed in front of the electric component in a direction in which the cooling water flows.

10. The heat management system of claim 1, wherein the refrigerant circulation line further includes a second expansion valve distributing the refrigerant branched behind the water-cooled type condenser in a direction in which the refrigerant flows, a chiller, and a refrigerant heat exchanger allowing the refrigerant flowing into the first expansion valve and the refrigerant discharged from the water-cooled type evaporator to be heat-exchanged with each other, the refrigerant heat exchanger being connected in parallel with the chiller.

11. The heat management system of claim 10, wherein the refrigerant heat exchanger is connected in series with the water-cooled type evaporator.

12. The heat management system of claim 10, wherein the cooling line includes a third connection line connected in parallel with the battery and passing through the chiller, the third connection line being connected to the cooling line by a third direction switching valve, and the cooling water flowing into or being blocked from flowing into the third connection line by the third direction switching valve.

13. The heat management system of claim 1, wherein the refrigerant circulation line further includes an accumulator disposed between the water-cooled type evaporator and the compressor and connected therebetween.

14. The heat management system of claim 1, wherein the cooling line includes an electric radiator cooling the cooling water using air.

15. The heat management system of claim 1, wherein the heating line includes a heater core heating the interior using air heated by allowing the cooling water heat-exchanged with the refrigerant through the water-cooled type condenser and air flowing into the interior to be heat-exchanged with each other, and a cooling water heater disposed in front of the heater core in a direction in which the cooling water flows and heating the cooling water.

16. The heat management system of claim 1, wherein the heating line includes a heater core heating the interior using air heated by allowing the cooling water heat-exchanged with the refrigerant through the water-cooled type condenser and air flowing into the interior to be heat-exchanged with each other, and further includes an air-heated type heater formed separately from the heating line and heating the interior by directly heating air flowing into the interior.

17. The heat management system of claim 10, wherein in a mild cooling mode, the second expansion valve is blocked not to allow the refrigerant to pass through the chiller.

18. The heat management system of claim 1, wherein in a battery heating mode, the refrigerant is not circulated through the refrigerant circulation line, and the cooling water is not circulated through the air conditioning line.

19. The heat management system of claim 1, wherein in a mild heating mode, the refrigerant is not circulated through the refrigerant circulation line, and the cooling water is not circulated through the air conditioning line.

20. A heat management system comprising:
a refrigerant circulation line including a compressor compressing and discharging a refrigerant, a water-cooled type condenser condensing the compressed refrigerant using cooling water, a first expansion valve expanding the condensed refrigerant, and a water-cooled type evaporator evaporating the expanded refrigerant using the cooling water;

a heating line including a heater core generating conditioned air for heating by circulating the cooling water heat-exchanged through the water-cooled type condenser;

an air conditioning line including a cabin cooler generating conditioned air for cooling by circulating the cooling water heat-exchanged through the water-cooled type evaporator; and a cooling line connected to or disconnected from the heating line to cool a battery and an electric component based on a cooling/heating mode;

wherein a refrigerant heat exchanger allows the refrigerant flowing into the first expansion valve and the refrigerant discharged from the water-cooled type evaporator to be heat-exchanged with each other in the cooling mode, and does not allow the refrigerant flowing into the first expansion valve and the refrigerant discharged from the water-cooled evaporator to be heat-exchanged with each other in the heating mode.

21. A heat management system comprising:

a refrigerant circulation line including a compressor compressing and discharging a refrigerant, a water-cooled type condenser condensing the compressed refrigerant using cooling water, a first expansion valve expanding the condensed refrigerant, and a water-cooled type evaporator evaporating the expanded refrigerant using the cooling water;

a heating line including a heater core generating conditioned air for heating by circulating the cooling water heat-exchanged through the water-cooled type condenser;

an air conditioning line including a cabin cooler generating conditioned air for cooling by circulating the cooling water heat-exchanged through the water-cooled type evaporator; and a cooling line connected to or disconnected from the heating line to cool a battery and an electric component based on a cooling/heating mode;

wherein the cooling line includes a first connection line 1 branched from one side of the cooling line and connected to the heating line, and a second connection line branched from the other side of the cooling line and connected to the heating line.

22. A heat management system comprising:

a refrigerant circulation line including a compressor compressing and discharging a refrigerant, a water-cooled type condenser condensing the compressed refrigerant using cooling water, a first expansion valve expanding the condensed refrigerant, and a water-cooled type evaporator evaporating the expanded refrigerant using the cooling water;

a heating line including a heater core generating conditioned air for heating by circulating the cooling water heat-exchanged through the water-cooled type condenser;

an air conditioning line including a cabin cooler generating conditioned air for cooling by circulating the cooling water heat-exchanged through the water-cooled type evaporator; and a cooling line connected to or disconnected from the heating line to cool a battery and an electric component based on a cooling/heating mode;

wherein the refrigerant circulation line further includes a second expansion valve distributing the refrigerant branched behind the water-cooled type condenser in a direction in which the refrigerant flows, a chiller, and a refrigerant heat exchanger allowing the refrigerant flowing into the first expansion valve and the refrigerant discharged from the water-cooled type evaporator to be heat-exchanged with each other, the refrigerant heat exchanger being connected in parallel with the chiller.

23. A heat management system comprising:

a refrigerant circulation line including a compressor compressing and discharging a refrigerant, a water-cooled type condenser condensing the compressed refrigerant using cooling water, a first expansion valve expanding the condensed refrigerant, and a water-cooled type evaporator evaporating the expanded refrigerant using the cooling water;

a heating line including a heater core generating conditioned air for heating by circulating the cooling water heat-exchanged through the water-cooled type condenser;

an air conditioning line including a cabin cooler generating conditioned air for cooling by circulating the cooling water heat-exchanged through the water-cooled type evaporator; and a cooling line connected to or disconnected from the heating line to cool a battery and an electric component based on a cooling/heating mode;

wherein the refrigerant circulation line further includes an accumulator disposed between the water-cooled type evaporator and the compressor and connected therebetween.

24. A heat management system comprising:

a refrigerant circulation line including a compressor compressing and discharging a refrigerant, a water-cooled type condenser condensing the compressed refrigerant using cooling water, a first expansion valve expanding the condensed refrigerant, and a water-cooled type evaporator evaporating the expanded refrigerant using the cooling water;

a heating line including a heater core generating conditioned air for heating by circulating the cooling water heat-exchanged through the water-cooled type condenser;

an air conditioning line including a cabin cooler generating conditioned air for cooling by circulating the cooling water heat-exchanged through the water-cooled type evaporator; and a cooling line connected to or disconnected from the heating line to cool a battery and an electric component based on a cooling/heating mode;

wherein the heating line includes a heater core heating the interior using air heated by allowing the cooling water heat-exchanged with the refrigerant through the water-cooled type condenser and air flowing into the interior to be heat-exchanged with each other, and a cooling water heater disposed in front of the heater core in a direction in which the cooling water flows and heating the cooling water.

25. A heat management system comprising:

a refrigerant circulation line including a compressor compressing and discharging a refrigerant, a water-cooled type condenser condensing the compressed refrigerant using cooling water, a first expansion valve expanding the condensed refrigerant, and a water-cooled type evaporator evaporating the expanded refrigerant using the cooling water;

a heating line including a heater core generating conditioned air for heating by circulating the cooling water heat-exchanged through the water-cooled type condenser;

an air conditioning line including a cabin cooler generating conditioned air for cooling by circulating the cooling water heat-exchanged through the water-cooled type evaporator; and a cooling line connected to or disconnected from the heating line to cool a battery and an electric component based on a cooling/heating mode;

wherein the heating line includes a heater core heating the interior using air heated by allowing the cooling water heat-exchanged with the refrigerant through the water-cooled type condenser and air flowing into the interior to be heat-exchanged with each other, and further includes an air-heated type heater formed separately from the heating line and heating the interior by directly heating air flowing into the interior.

* * * * *